(No Model.)

C. BENNET.
CHURN.

No. 369,426. Patented Sept. 6, 1887.

Witnesses:
W. C. Jirdinston.
C. D. Kur.

Inventor:
Charles Bennet
by R. M. Hosea
his Attorney.

UNITED STATES PATENT OFFICE.

CHARLES BENNET, OF MANCHESTER, ASSIGNOR OF ONE-HALF TO CHARLES ARKENBERG, OF MILAN, INDIANA.

CHURN.

SPECIFICATION forming part of Letters Patent No. 369,426, dated September 6, 1887.

Application filed October 20, 1886. Serial No. 216,768. (No model.)

*To all whom it may concern:*

Be it known that I, CHARLES BENNET, a citizen of the United States, residing at Manchester, Dearborn county, Indiana, have invented new and useful Improvements in Churns, of which the following is a specification.

My invention relates to churns, its object being to provide an efficient mechanism for the agitation and "aeration" of the cream in order to obtain a more speedy and larger yield of butter.

To this end it consists in the construction of the churn and its operating mechanism, as hereinafter more fully described.

Figure 1:
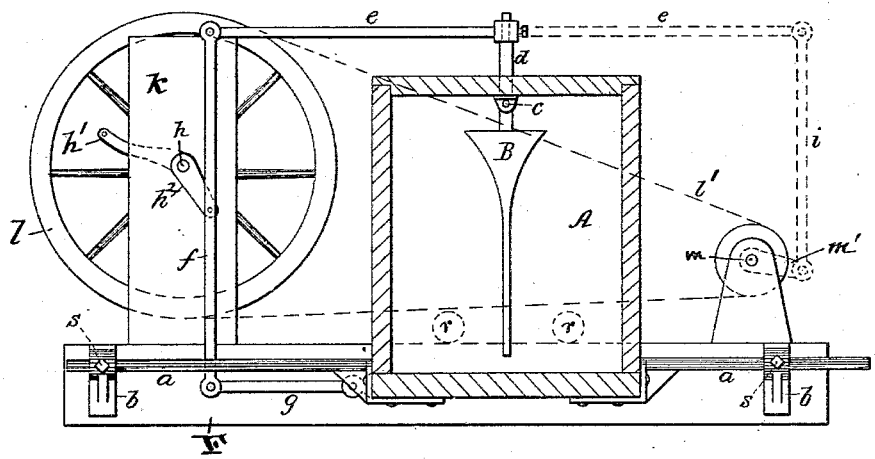
Figure 2:
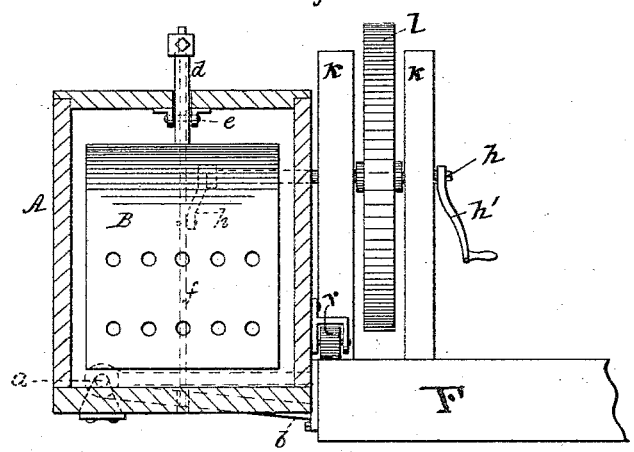

In the accompanying drawings, illustrating my invention, Figure 1 is a side elevation of the apparatus, showing the churn in section; and Fig. 2, an end elevation of the same, showing the churn in section.

Referring now to the drawings, in which the parts herein referred to are indicated by the letters of reference, A designates the body of the churn, which is preferably a box of rectangular form with a removable cover.

B designates the "dasher," which is in paddle form, as shown, pivoted to the top of the churn at $c$, and having a handle, $d$, projecting upward through the cover.

The entire apparatus is mounted on a base-frame, F, of convenient construction supporting the driving apparatus, presently to be described, and the churn proper.

The churn-body is intended to have a reciprocating horizontal motion, to which end it is provided with friction-rollers $r$ $r$ at one side, having a rolling bearing upon the frame F, and supporting-bars $a$ $a$ projected in the same axial line at opposite sides of the churn and supported in sliding bearings upon or in brackets $b$ $b$, secured to the frame F. The mode of mounting the churn upon the frame F may, however, be varied, as preferred, it being essential only to provide for the reciprocating motion referred to.

The driving mechanism is as follows: Upon the platform F, in uprights $k$ $k$, is mounted a driving-shaft, $h$, carrying a band fly-wheel, $l$. The shaft is provided at one end with an operating hand-crank, $h'$, and at the other with a driving-crank, $h^2$, the latter being connected with the following mechanism: To the front of the churn is attached a pivotal link, $g$, projecting to a point in line with the crank $h^2$, and at the top of the churn and projecting to the same vertical line with the link $g$ is a connecting-rod, $e$, which has a detachable but temporarily rigid connection with the upper end of the dasher-arm $d$. The rod $e$ and link $g$ are terminally connected by a "parallel rod," $f$, which is pivoted midway to the crank $h^2$. This mechanism, as will be observed, produces a double effect upon the churn, to wit: a horizontal reciprocation of the churn and a vibratory or pendulous motion of the dasher in relatively opposite directions. These opposing movements of the churn and its dasher are assisted by the outward curving surface of the dasher and its upper part, by which the liquid contents of the churn are thrown relatively outward at each side and prevented from meeting over the top of a dasher or passing out through the aperture in the cover.

There may be added an alternative driving mechanism for operating the dasher alone, but more rapidly, as follows: A counter-shaft, $m$, is mounted at the opposite end of the platform F, driven by a band, $l'$, from the fly-wheel $l$, and carries a crank, $m'$. The connecting-rod $e$, being shifted to the position shown in dotted lines and resecured again rigidly to the dasher-arm $d$, is terminally connected with the crank $m'$ by link $i$. It will now be evident that the rotation of the counter-shaft $m$ will vibrate the dasher B without moving the churn A, which latter, however, is made fast by set-screws $s$, provided at its bracket-bearings $b$. The belt-connection $l'$ is arranged to multiply speed, so as to give the dasher a more rapid motion than before.

It is intended by thus introducing two different driving mechanisms to adapt the apparatus to best results for both summer and winter use. Thus, in winter, when the temperature renders the operation of butter-making more sluggish and difficult, the first-described mechanism may be used, producing a more violent agitation of the churn contents, and in summer the last-described mechanism may be employed; but though preferable I do not regard the last-described mechanism as essential, and it may be wholly omitted if desired and the same practical effect produced by disconnecting the link $g$ from the parallel rod $f$, securing the churn by the set-screws $s$, and revolving the shaft $h$ with the rapidity desired.

I claim as my invention and desire to secure by Letters Patent of the United States—

1. The combination, in a power-churn, of a churn-body, A, pivoted dasher B, rod-connections $e$ $f$ $g$, and the driving-crank $h^2$, substantially as set forth.

2. In a power-churn, the combination of a platform, F, provided with brackets $b$, the churn-body provided with friction-rollers $r$, and supporting-bars $a$, the pivoted dasher B, and the driving-connections, substantially as set forth.

3. The combination of the churn-body A, pivoted dasher B, rigid extension $e$, pivoted connecting-rod $f$, and crank $h'$, substantially as set forth.

In testimony whereof I have hereunto set my hand in the presence of two subscribing witnesses.

CHARLES BENNET.

Witnesses:
CHARLES ARKENBERG,
L. M. HOSEA.